United States Patent [19]

Creticos

[11] 3,997,495
[45] Dec. 14, 1976

[54] ORGANOMETALLIC STABILIZERS FOR VINYL CHLORIDE POLYMERS

[75] Inventor: Peter S. Creticos, Sullivan's Island, S.C.

[73] Assignee: Westvaco Corporation, New York, N.Y.

[22] Filed: Jan. 14, 1976

[21] Appl. No.: 649,059

[52] U.S. Cl. .............. 260/45.75 W; 260/45.85 V; 260/429 R; 260/429.9; 260/514 L

[51] Int. Cl.$^2$ .................. C08K 5/09; C07C 61/22

[58] Field of Search ............ 260/514 L, 429.9, 429, 260/45.85 V, 45.75 W

[56] References Cited

UNITED STATES PATENTS

| | | | |
|---|---|---|---|
| 3,305,568 | 2/1967 | Klemchuk | 260/45.85 V |
| 3,347,823 | 10/1967 | Buckley | 260/45.85 V |
| 3,753,968 | 8/1973 | Ward | 260/97.6 |

*Primary Examiner*—V. P. Hoke
*Attorney, Agent, or Firm*—Richard L. Schmalz; Ernest B. Lipscomb, III

[57] ABSTRACT

Disclosed herein are novel compounds of the formula

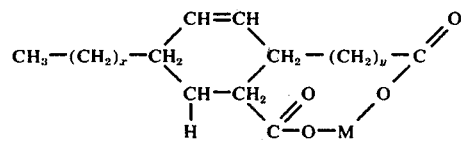

wherein $x$ and $y$ are integers from 3 to 9, $x$ and $y$ together equal 12 and wherein M is a divalent metal cation from the group consisting of calcium, barium, zinc and cadmium. These organometallic compounds are effective stabilizers of vinyl halide polymers against the deteriorative effects of heat and light.

12 Claims, No Drawings

ORGANOMETALLIC STABILIZERS FOR VINYL CHLORIDE POLYMERS

BACKGROUND OF THE INVENTION

1. Field of the Invention

This invention relates to organometallic compounds. More particularly, it relates to organometallic stabilizers made from a $C_{21}$-cycloaliphatic dicarboxylic acid and used to reduce degradation of polyvinyl halide resin compositions.

2. The Prior Art

Polyvinyl chloride degradation is faciliatated under conditions of elevated temperature and prolonged processing. The mechanism of degradation is a dehydrochlorination reaction. Polyvinyl chloride is a complex mixture of both straight and branched chains. Ideally, the vinyl chloride monomer polymerizes in a regularly ordered, repeating head-to-head monomer. However, termination of the polymer chain is responsible for a number of different end-group structures and internal anomalies.

The degradation of polyvinyl chloride is due initially to the "popping out" of an HCl molecule, which may be brought about by heat, from an [allylic] chlorine atom which then acts as an activating group as shown in the following sequence wherein X is the activating group:

[1] — $CH_2$ — $CHCl$ — $CH_2$ — $CHCl$ — $CH_2$ — $CHCl$ — X —

[2] — $CH_2$ — $CHCl$ — $CH_2$ — $CHCl$ — $CH = CH$ — X —

[3] — $CH = CH$ — $CH = CH$ — $CH = CH$ — X —

The elimination of the first HCl molecule and the subsequent formation of an unsaturated double bond on the polyvinyl chloride polymer chain activates the neighboring chlorine atom (allylic), initiating the unzippering of the chain. As heat induced degradation reaches its later stages, darkened color and detrimental physical changes occur.

Metal soaps, organotin compounds, and epoxides have been found to be the most effective stabilizers in combating polyvvinyl chloride degradation. The ideal polyvinyl chloride stabilizer should not only retard heat and mechanical degradation but also resist light and oxidative actions. The stabilizer apparently disrupts the chain-reaction polyene formation and thwarts the elimination of HCl from the vinyl chloride polymer. The metal soap is capable of absorbing the HCl evolved and "repairing" the segment of the damaged polymer by ester exchange. Thus, the chlorine atoms lost from the polymer chain are replaced by ester groups from the soap. A review of polyvinyl chloride entitled "PVC Primer" may be found in Plastics Engineering, Vol XXIX, No. 12, pp. 26–40 (Dec. 1973.)

Thus, it is an object of this invention to provide novel organometallic compounds made from a $C_{21}$-cycloaliphatic dicarboxylic acid. Another object of this invention is to provide vinyl halide polymer compositions containing the novel organometallic stabilizers. Other objects, features and advantages of this invention will be evident from the following detailed description.

SUMMARY OF THE INVENTION

In accordance with this invention, it has been found that divalent metal compounds of calcium, barium, zinc and cadimum and a $C_{21}$-cycloaliphatic dicarboxylic acid are effective stabilizers for vinyl halide resins. These organometallic compounds have good low temperature properties and low volatility. These organometallic stabilizers are completely compatible with polyvinyl chloride and other vinyl halide resin compositions containing them.

DETAILED DESCRIPTION OF THE INVENTION

The organometallic compounds of this invention have the structural formula

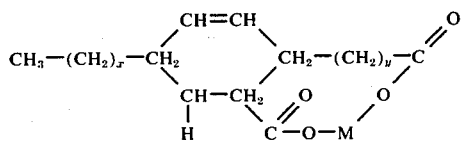

wherein $x$ and $y$ are integers from 3 to 9, $x$ and $y$ together equal 12 and werein M is a divalent metal cation from the group consisting of calcium, barium, zinc and cadimum.

The organometallic compounds of this invention may be prepared from the $C_{21}$-cycloaliphatic dicarboxylic acid described in U.S. Pat. 3,753,968 to B. F. Ward and incorporated herein by reference. The divalent metal salts may be prepared from a dilute aqueous solution, say about 10%, of a sodium salt of the $C_{21}$-cycloaliphatic dicarboxylic acid, and reacted with a dilute chloride solution of the chosen metal cation at room temperature. The organometallic compound will precipitate as a metal salt and may be recovered as a powder. Another process for obtaining the compounds of this invention is by fusion of the cationic hydroxide and the $C_{21}$-cycloaliphatic dicarboxylic acid.

A small amount of the metal salt is all that need be present in the stabilized compositions. Although 1% to 5% of the stabilizer, based on the weight of the vinyl halide resin, is preferred, it has been found that as little as 0.5% of the stabilizer, based on the weight of the vinyl halide resin, will bring about a significant improvement in the heat stability of the composition. Approximately 10% or more of the stabilizer can be used, but these larger amounts generally do not provide further improvement in the properties of the resinous compositions.

This invention is of particular value in the stabilization of rigid polyvinyl chloride composition, that is, compositions which are formulated to withstand temperatures of at least about 175° C. The novel stabilizers can also be used in plasticized vinyl halide resin compositions of conventional formulation where high softening point is not a requisite. The vinyl halide resins that may be employed in such compositions include both vinyl halide homopolymers, such as polyvinyl chloride, polyvinyl bromide, and polyvinylidene chloride and copolymers, such as those formed by the polymerization of a vinyl halide with up to about 30% of a comonomer, such as vinyl acetate, vinyl propionate, vinylidene chloride, styrene, methyl methacrylate, ethylene, and the like. The invention is also applicable to mixtures of a vinyl halide resin in a major proportion with a minor proportion of other synthetic resins, such as chlorinated polyethylene, polyacrylate and polymethacrylate esters, polyacrylonitrile, and terpolymers of acrylonitrile, butadiene, and styrene. Any of the wellknown plasticizers for vinyl halide resins can be used including dioctyl phthalate, dibutyl sebacate, tricresyl phosphate, and octyl diphenyl phosphate.

In addition to the ingredients described, the stabilized resinous compositions may contain other resin additives, such as pigments, dyes, extenders, processing aids, fillers, and light stabilizers, in the amount ordinarily employed for the purposes indicated.

The stabilized vinyl halide resin compositions may be prepared by any convenient procedure. One method is to blend the stabilizer with the vinyl halide resin using plastic mixing rolls at a temperature at which the mix is fluid and to mill the composition on a two-roll mill at from 150° C. to 200° C. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

The practice of this invention may clearly be seen in the following examples.

EXAMPLE 1

To a solution of 6.23 grams sodium hydroxide in 252 grams of water were added 28 grams of the $C_{21}$-cycloaliphatic dicarboxylic acid to form a 10% salt solution. This solution was cooled below room temperature, and to it was added with vigorous stirring a 10% metal salt solution of barium chloride. The barium salt of the $C_{21}$-cycloaliphatic dicarboxylic acid precipitated as a white powder. The barium salt was washed and filtered. The metal salt was placed in the oven and dried. The 37 grams of white powder were a yield in excess of 95% of theoretical.

EXAMPLE 2

To a solution of 8.29 grams of sodium hydroxide in 334.8 grams of warm water were added 37.2 grams of the $C_{21}$-cycloaliphatic dicarboxylic acid to form a salt solution. To this 10% salt solution was added a 10% metal salt solution of calcium chloride with agitation. The calcium soap of the $C_{21}$-dicarboxylic acid precipitated as off-white granules. It was filtered and washed with water. The product was dried and placed in dessicator for 24 hours. A yield of 40 grams (97%) was obtained.

EXAMPLE 3

To a solution of 5.65 grams of sodium hydroxide in 228 grams of water was added 25.3 grams of the $C_{21}$-cycloaliphatic dicarboxylic acid to form a salt solution. To this 10% soap, a cooled 10% metal salt solution, zinc sulfate, was added with stirring. The zinc salt precipitated as a white powder. The zinc salt was filtered and washed. The product was then washed with an $H_2O$/EtOH/ether solution and placed overnight in the dessicator.

EXAMPLE 4

To a solution of the $C_{21}$-cycloaliphatic dicarboxylic acid were added 37 grams of acid to 333 grams of water containing 8.3 grams of sodium hydroxide. This 10% salt solution was cooled below 37° C. and slowly added to a 10% solution of cadimum chloride. The yield of cadimum salt was 46 grams (94% of theoretical). A white powder precipitated and was washed and dried.

Tables I and II give those physical properties pertinent to the various metal salts. In particular, as shown in Table I, the metal salts from Examples 1–4 carried a higher percentage of metal than do their counterparts of the tall oil fatty acids, stearates and laurates.

TABLE I

| | % METAL DETERMINATIONS OF SALT OF VARIOUS FATTY ACIDS | | | |
|---|---|---|---|---|
| Metal | Inventions* | Tall Oil Fatty Acid | Stearate | Laurate |
| Ca | 10.3% | 6.6% | 6.6% | 8.8% |
| Zn | 15.7% | 10.4% | 10.3% | 14.1% |
| Ba | 28.2% | 19.6% | 19.5% | 25.6% |
| Cd | 24.0% | 16.6% | 16.5% | 22.0% |

Note:
*Salts from Examples 1–4.

The samples were then monitored over a specific time period in the oven and melting points compared. The results appear in Table II.

TABLE II

| | MELTING POINTS OF METAL SALTS, ° C. | | | |
|---|---|---|---|---|
| Metal | Invention | Tall Oil Fatty Acid | Stearate | Laurate |
| Ca | >240 | 80–150 | 180 | 183 |
| Zn | >172 | 72–78 | 125 | 128 |
| Ba | 255 | 220 | — | 260 |

The results in Table II illustrated the high melting point and thus low volatility of the organometallic salts of this invention.

EXAMPLE 5

A series of stabilized polyvinyl chloride resin compositions were prepared using the various metal salts of the $C_{21}$-dicarboxylic acid prepared in Examples 1–4 and compared to metal salts of other fatty acids. The results were obtained monitoring the degradation of a resin formulated with 100 parts polyvinyl chloride (PVC) resin (Geon 121), plasticized with 50 parts dioctyl phthalate (DOP), and incorporating various amounts of stabilizer. The formulation was stirred thoroughly, and the resulting thick liquid (paste) was put in a petri dish and placed in a 180° C. air-circulating oven. It was most important that all of the dry PVC resin and dry soap stabilizer be completely mixed in the DOP plasticizer so that a uniform liquid be produced.

Heat stability of the metal salts was determined by measuring the evolution of HCl from a quantity of PVC resin using Congo Red paper. Premilled strips were placed in a forced-air oven at 180° C. and the color sequence followed until degradation.

TABLE III

| | COLOR DEGRADATION WITH STABILIZER | |
|---|---|---|
| Percent by Weight | Formulation PVC Resin | Time (minutes) To Initial Degradation |
| | No Stabilizer | 2 |
| 1.0 | Zinc stearate | 6½ |

TABLE III-continued

COLOR DEGRADATION WITH STABILIZER

| Percent by Weight | Formulation PVC Resin | Time (minutes) To Initial Degradation |
|---|---|---|
| 1.0 | Zinc tallate | 6½ |
| 1.0 | Zinc stabilizer from Ex. 3 | 10½ |
| 0.6 | Calcium stabilizer from Ex. 2 | 11 |
| 1.0 | Barium stearate | 7¾ |
| 1.0 | Barium stabilizer from Ex. 1 | 8¾ |
| 0.4 | Calcium stabilizer from Ex. 2 and | |
| 0.4 | Zinc stabilizer from Ex. 3 | 15 |

Results of the Congo Red testing showed the organometallic compounds of this invention stabilized the PVC resin comparatively with the metal salt of the comparative compound and had good long term heat stability.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Organometallic compounds having the structural formula

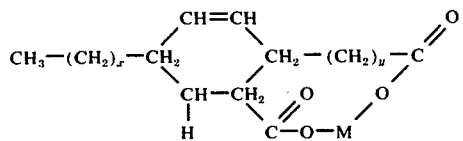

wherein $x$ and $y$ are integers from 3 to 9, $x$ and $y$ together equal 12 and wherein M is a divalent metal cation selected from the group consisting of calcium, barium, zinc and cadmium.

2. The organometallic compound of claim 1 wherein M is calcium.

3. The organometallic compound of claim 1 wherein M is barium.

4. The organometallic compound of claim 1 wherein M is zinc.

5. The organometallic compound of claim 1 wherein M is cadmium.

6. A halogen-containing polymer composition comprising;

a. a polymer selected from the group consisting of polyvinyl chloride, polyvinylidene chloride and copolymers of vinyl chloride or vinylidene chloride with at least one ethylenically unsaturated monomer, and b. an effective amount of an organometallic compound to stabilize said polymer against deterioration from heat, said organometallic compound having the structural formula

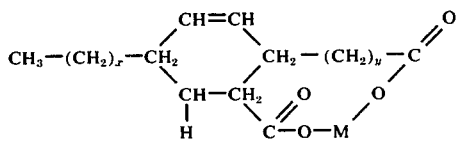

wherein $x$ and $y$ are integers from 3 to 9, $x$ and $y$ together equal 12 and wherein M is a divalent metal cation selected from the group consisting of calcium, barium, zinc, cadmium, and mixtures thereof.

7. The polymer composition of claim 6 wherein M is calcium.

8. The polymer composition of claim 6 wherein M is cadmium.

9. The polymer composition of claim 6 wherein M is zinc.

10. The polymer composition of claim 6 wherein M is cadmium.

11. The polymer composition of claim 6 werein said organometallic compound is added in an amount of 0.5% to 10.0% by weight.

12. The polymer composition of claim 11 wherein said organometallic compound is added in an amount of 1% to 5% by weight.

* * * * *

UNITED STATES PATENT AND TRADEMARK OFFICE
CERTIFICATE OF CORRECTION

PATENT NO. : 3,997,495
DATED : December 14, 1976
INVENTOR(S) : Peter S. Creticos It is certified that error appears in the above-identified patent and that said Letters Patent are hereby corrected as shown below:

Column 2, line 1, "cadimum" should read --cadmium--.

Column 2, line 23, "cadimum" should read --cadmium--.

Column 4, line 7, "cadimum" should read --cadmium--.

In claim 10, column 6, line 43, "cadimum" should read --cadmium--.

Signed and Sealed this

Twelfth Day of April 1977

[SEAL]

Attest:

RUTH C. MASON
*Attesting Officer*

C. MARSHALL DANN
*Commissioner of Patents and Trademarks*